(12) United States Patent
Oveis Gharan et al.

(10) Patent No.: US 10,211,919 B2
(45) Date of Patent: Feb. 19, 2019

(54) MITIGATION OF NARROW-BAND DEGRADATIONS IN A BROADBAND COMMUNICATION SYSTEM

(71) Applicants: Shahab Oveis Gharan, Nepean (CA); Kim B. Roberts, Ottawa (CA)

(72) Inventors: Shahab Oveis Gharan, Nepean (CA); Kim B. Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 70 days.

(21) Appl. No.: 14/794,944

(22) Filed: Jul. 9, 2015

(65) Prior Publication Data

US 2017/0012704 A1    Jan. 12, 2017

(51) Int. Cl.
*H04B 10/69* (2013.01)
*H04L 27/26* (2006.01)
*H04B 10/2507* (2013.01)

(52) U.S. Cl.
CPC ....... *H04B 10/2507* (2013.01); *H04B 10/697* (2013.01); *H04L 27/2634* (2013.01)

(58) Field of Classification Search
CPC . H04B 1/40; H04B 1/406; H04B 1/51; H04B 1/58; H04B 1/581; H04B 1/587; H04B 10/112; H04B 10/1121; H04B 10/1125; H04B 10/12; H04B 10/142; H04B 10/2507; H04B 10/2527; H04B 10/5165; H04B 10/61; H04B 10/612; H04B 10/616; H04B 10/6163; H04B 10/697; H04L 5/0007; H04L 5/001; H04L 27/2601; H04L 27/2604; H04L 27/2621; H04L 27/2628; H04L 27/263; H04L 27/2633; H04L 27/2634; H04L 27/2636; H04L 27/2637; H04L 27/2639; H04L 27/265; H04L 27/2697
USPC ....... 375/259–262, 265, 270, 277, 284, 285, 375/321, 324, 325, 346; 370/208, 210
See application file for complete search history.

(56) References Cited

U.S. PATENT DOCUMENTS

| | | | |
|---|---|---|---|
| 6,324,559 B1 * | 11/2001 | Hellberg | H03H 17/0213 708/315 |
| 6,781,537 B1 | 8/2004 | Taraschuk et al. | |
| 7,321,734 B2 | 1/2008 | Roberts et al. | |
| 7,701,842 B2 | 4/2010 | Roberts et al. | |
| 8,983,309 B2 | 3/2015 | Harley et al. | |
| 9,667,348 B1 | 5/2017 | Roberts et al. | |
| 2004/0087279 A1 * | 5/2004 | Muschallik | H04B 1/30 455/73 |

(Continued)

*Primary Examiner* — Young T Tse
(74) *Attorney, Agent, or Firm* — Integral Intellectual Property Inc.; Miriam Paton; Amy Scouten

(57) ABSTRACT

In a communications system having an analog channel configured to convey a data signal from a transmitter to a receiver, a method of mitigating narrow-band impairment imposed by the analog channel on the data signal within a bounded spectral region of a spectrum of the data signal. A transmitter digital signal processor (Tx DSP) applying a first adaptation function to the data signal prior to transmitting the data signal through the analog channel. A receiver digital signal processor (Rx DSP) applying a second adaptation function to the data signal received through the analog channel. The first and second adaptation functions are selected to cooperatively mitigate effects of the narrow-band impairment imposed by the analog channel.

19 Claims, 10 Drawing Sheets

(56) References Cited

U.S. PATENT DOCUMENTS

| | | | |
|---|---|---|---|
| 2010/0158078 A1* | 6/2010 | Ro | H04B 1/7143 375/135 |
| 2011/0211549 A1* | 9/2011 | Au | H04L 5/003 370/329 |
| 2013/0003817 A1* | 1/2013 | Ling | H04L 25/03159 375/232 |
| 2013/0209093 A1* | 8/2013 | Tanimura | H04B 10/0775 398/32 |
| 2013/0259173 A1* | 10/2013 | Varanese | H04L 1/0001 375/346 |
| 2014/0169501 A1* | 6/2014 | Nazarathy | H03H 17/0266 375/316 |
| 2014/0169793 A1 | 6/2014 | Harley et al. | |
| 2015/0180693 A1* | 6/2015 | Trojer | H04J 4/00 370/294 |
| 2016/0006530 A1* | 1/2016 | Nazarathy | H04J 11/0023 398/76 |

\* cited by examiner

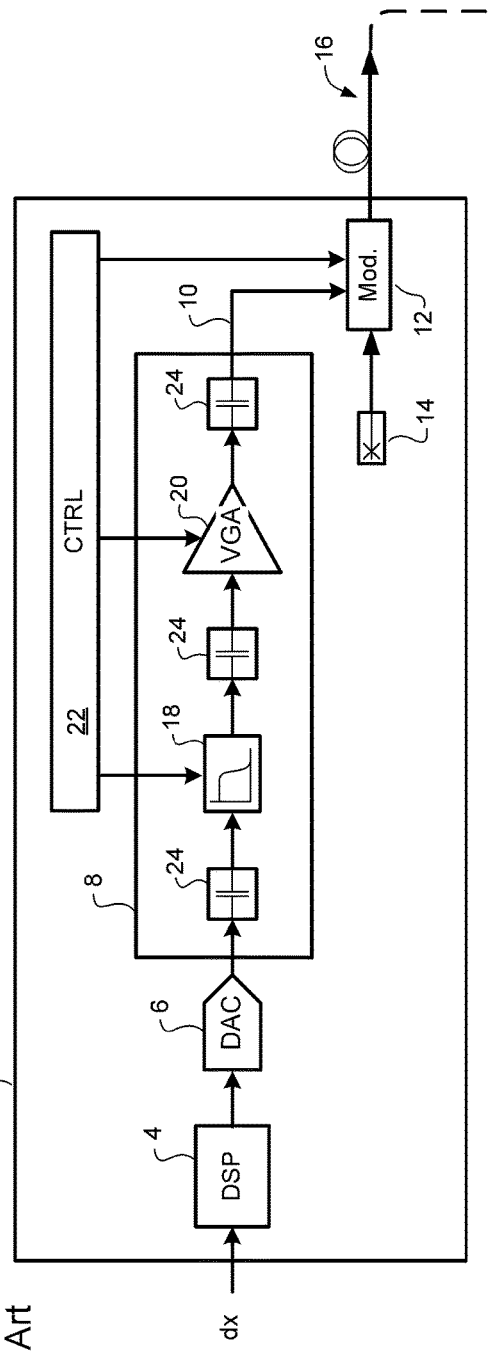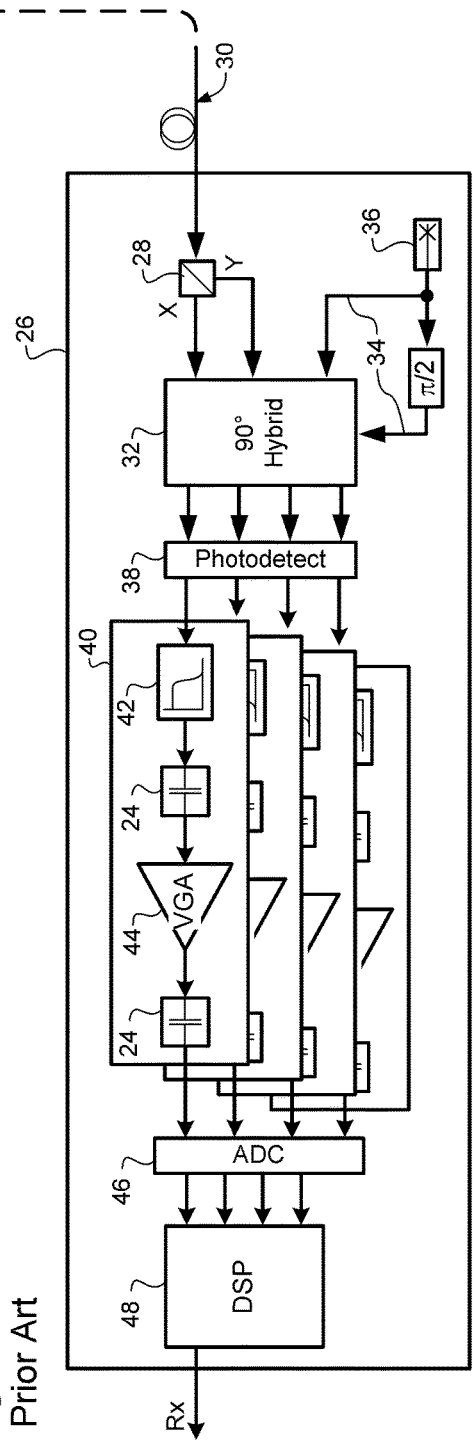
Figure 1A
Prior Art
Figure 1B
Prior Art

MITIGATION OF NARROW-BAND DEGRADATIONS IN A BROADBAND COMMUNICATION SYSTEM

CROSS-REFERENCE TO RELATED APPLICATIONS

This is the first patent application filed in respect of the present invention.

FIELD OF THE INVENTION

The present application relates generally to communications systems, and more specifically to mitigation of broadband degradations in a broadband communication system.

BACKGROUND

In modern communications systems, it is common to configure a communications link comprising a pair of digital signal processors separated by an analog channel. For example, in an optical communications network, an optical link may include digital signal processors in the transmitter and receiver, that exchange signals through an analog channel that includes analog driver and modulator circuits in the transmitter, detector circuits in the receiver, and one or more optical fiber spans extending between the transmitter and the receiver.

Typically, the analog channel is formed as a series of circuit blocks defining, for example, filters and amplifiers. In order to enable differing biasing requirements of each block, it is common to insert an AC-coupling capacitor between adjacent circuit blocks. The AC-coupling capacitor is beneficial in that it blocks direct current (DC) flow between adjacent circuit blocks, while permitting relatively unimpeded passage of Alternating Current (AC) signal components. However, a limitation of this technique is that the AC-coupling capacitors in the analog channel operate as a high-pass filter which suppresses the signal components within a notch centered at 0 Hz. For direct detection receivers, this notch will appear in the received signal spectrum, centered on 0 Hz. On the other hand, in a coherent receiver, the detected signal is down-converted to a desired band for digital processing, and the notch may be located at a frequency that is offset from 0 Hz by an amount that is dependent on the frequency difference between the transmitter and receiver oscillators. In the case of an optical communications system, the transmitter and receiver oscillators are provided by lasers that are prone to random and deterministic frequency excursions. This means that the frequency difference between the two lasers fluctuates in time, and so the location of the notch in the received signal spectrum will tend to vary randomly within a bounded region centered on 0 Hz. This moving notch in the received signal spectrum has the effect of introducing significant distortion into low frequency components of the received signal.

Known methods of addressing the baseband notch, and the consequent low-frequency distortion in the received signal focus on attempting to reduce the width of the notch, reducing the frequency difference between the transmitter and receiver oscillators, and reducing the frequency jitter of the transmitter and receiver oscillators. In practice, reducing the width of the notch may be accomplished by increasing the size of the AC coupling capacitors. While the capacitors themselves are inexpensive, their physical size interferes with efforts to reduce the footprint of the transmitter and the receiver, and so tends to increase the cost of packaging these components.

It is known to apply linear operations, such as precompensation or Wiener Filtering, at the transmitter and/or receiver to reduce the penalty due to a lack of gain or excess noise in a subset of the channel's spectrum.

It is known to apply coding to a stream of information bits so as to alter the spectral characteristics of the signal created by on-off keying with that bit stream. Examples include 8B10B, AMI, and duobinary. However, with modern complex constellations the relationship between the patterns in the bit stream and the spectrum after modulation by that bit stream is very intricate.

It is known to apply modulation methods, such as spread-spectrum or CDMA, that significantly broaden the bandwidth of the resulting signal and provide corresponding resilience to narrow-band degradations. Most optical communications applications cannot tolerate the costs from a large increase in the signal bandwidth.

It is known to apply modulation methods, such as OFDM or DMT, where the bit stream is partitioned into a large number of subsets that are modulated onto parallel carriers, and different constellations are used in different subsets depending upon the noise level therein. However, channel nonlinearities can severely degrade the performance of a signal comprising a large number of parallel modulations.

Techniques for minimizing the requirement for large AC coupling capacitors in a communications system remain highly desirable.

SUMMARY

An aspect of the present invention provides a communications system having an analog channel configured to convey a data signal from a transmitter to a receiver, a method of mitigating narrow-band impairment imposed by the analog channel on the data signal within a bounded spectral region of a spectrum of the data signal. A transmitter digital signal processor (Tx DSP) applying a first adaptation function to the data signal prior to transmitting the data signal through the analog channel. A receiver digital signal processor (Rx DSP) applying a second adaptation function to the data signal received through the analog channel. The first and second adaptation functions are selected to cooperatively mitigate effects of the narrow-band impairment imposed by the analog channel.

BRIEF DESCRIPTION OF THE DRAWINGS

Further features and advantages of the present invention will become apparent from the following detailed description, taken in combination with the appended drawings, in which:

FIGS. 1A and 1B are block diagrams illustrating an optical communications system;

It will be noted that throughout the appended drawings, like features are identified by like reference numerals.

DETAILED DESCRIPTION

Figure 2A:
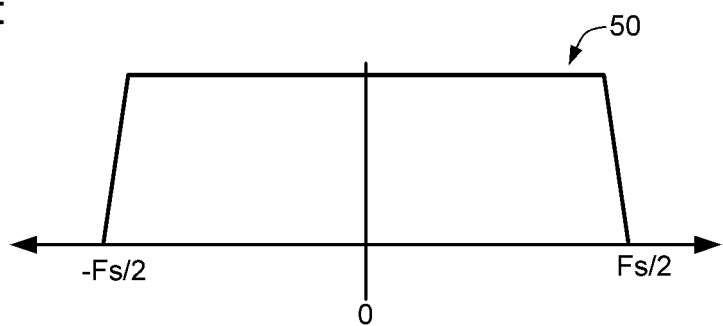
FIGS. 2A to 2C illustrate operation of optical communications system of FIGS. 1A and 1B.

In the following detailed description, precise mathematical language and idealized signal spectra are used for simplicity of description and illustration. It must be recognized that practical implementations of functions generally have small imperfections such as clipping, quantization, noise, or distortion, while the physical optical connection adds noise and distortions to the optical signal. For simplicity, these non-idealities are ignored in the examples described below. However, it will be appreciated that the present techniques can be readily applied to practical communications systems with real (non-ideal) performance characteristics.

The following description uses specific examples that address the problems posed by AC-coupling capacitors in an optical communications network. However, the present technique is not limited to these examples. Rather, the present techniques may usefully be employed in any system where a signal is processed by a digital signal processor prior to being transported through an analog channel that imposes a frequency dependent impairment within a bounded spectral region, and the signal subsequently processed by a digital signal processor at an opposite end of the analog channel.

FIG. 1A schematically illustrates a transmitter 2 of a type commonly used in optical communications networks. The transmitter 2 generally includes a digital signal processor (DSP) 4 cascaded with a digital-to-analog converter (DAC) 6 and an analog driver 8 for supplying a drive signal 10 to modulator 12 which modulates a continuous wave (CW) carrier light generated by a narrow-band light source 14 to generate a modulated optical signal 16 for transmission through the optical communications system. Typically, the DSP 4 is configured to process an input digital data signal dx to generate a digital drive signal. Typical functions performed by the DSP 4 include signal encoding, equalization, and pre-compensation of optical impairments of the communications network. The digital drive signal output from the DSP 4 is then converted to a corresponding analog drive signal by the DAC 6 and supplied to the analog driver 8, which conditions the analog drive signal to suit the dynamic range and power requirements of the modulator 12. Typically, the analog driver 8 includes one or more filter 18 and Variable Gain Amplifiers (VGAs) 20, although other analog signal processing functions may also be provided. One or more control circuits 22 may be used to control the gain of the VGA 20 and the bias states of the filter 18 and the modulator 12.

As is well known in the art, it is desirable to allow a DC voltage offset between each of the circuit blocks of the analog driver 8. This is commonly accomplished by inserting AC-coupling capacitors 24 in the signal path between each of the circuit blocks, as may be seen in FIG. 1A. Each AC-coupling capacitor 24 effectively blocks DC flow between each cascaded circuit blocks, while permitting the Alternating Current (AC) components of the analog signal to propagate through the driver 8 with low losses (which can generally be compensated by the VGA 20).

FIG. 1B schematically illustrates a coherent receiver 26 of a type commonly used in optical communications networks. The receiver 26 generally includes a polarization beam splitter 28 for splitting the received optical signal 30 into received X and Y polarizations, an optical hybrid 32 for separately mixing the X and Y polarizations with a local oscillator light 34 generated by an Rx laser 36, and a set of photodetectors 38 for detecting the optical power of each of the mixing products generated by the optical hybrid 32. The output of each photodetector 38 may then be processed through an analog path 40 which may include low-pass filters 42 and Variable Gain Amplifiers (VGAs) 44, although other analog signal processing functions may also be provided. These analog circuit blocks are typically separated by AC-coupling capacitors 24 in the same manner as described above with reference to FIG. 1A. An Analog to Digital (A/D) converter block 46 samples each photodetector current, and the resulting sample streams, each of which represents one of the modulated dimensions of the received optical signal field, are processed by an Rx Digital Signal Processor (DSP) 48 in accordance with the M-dimensional constellation to generate a recovered signal Rx that corresponds with the transmitted data signal dx.

Figure 2B:
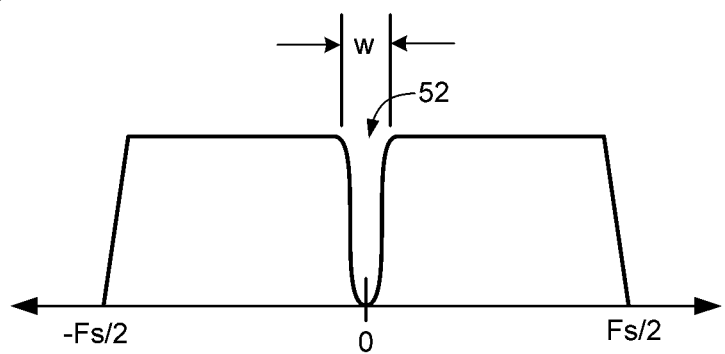
Figure 2C:
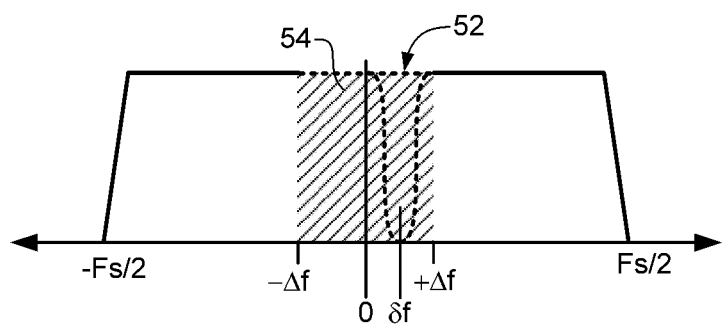

FIGS. 2A-2C illustrate the effect of the AC-coupling capacitors 24 in the transmitter 2 and coherent receiver 26 shown in FIGS. 1A and 1B. As may be seen in FIG. 2A, at the output of the DAC 6, the signal has a baseband spectrum 50 that spans a frequency range from −Fs/2 to +Fs/2, where Fs is the sample rate of the DAC 6. As may be seen in FIG. 2B, at the output of the transmitter analog driver 8 the baseband spectrum has been distorted by the inclusion of a notch 52 of width w centered on 0 Hz. This notch is produced by the high-pass filtering effect of the AC-coupling capacitors in the transmitter analog driver 8.

In the coherent receiver 26, the detected signal is down-converted to a desired frequency band for digital processing, so that the AC-coupling notch 52 may be located at a frequency that is offset from 0 Hz by an amount that is dependent on the frequency difference δf between the transmitter laser 14 and receiver laser 36. Due to frequency jitter of the two lasers, the frequency difference δf will tend to fluctuate in time, with the result that the location of the AC-coupling notch 52 in the received signal spectrum will tend to vary within a bounded spectral region 54 that is nominally centered on 0 Hz, as may be seen in FIG. 2C. This moving AC-coupling notch in the received signal spectrum has the effect of introducing significant distortion into low frequency components of the received signal. While not truly noise, this narrow-band distortion of the broad signal spectrum can be approximated as additive Gaussian coloured noise.

It may also be noted that the AC-coupling capacitors 24 in the receiver analog path 40, will also introduce a notch (not shown) at 0 Hz in the received spectrum. However, since this notch is not subject to frequency jitter, it remains stationary at 0 Hz. As such it tends to double the effective AC coupling distortion when the two notches do not overlap.

For the purpose of the present application, the term "bounded spectral region" shall be understood to refer to a defined portion of the channel spectrum, that has a width much less than the total channel bandwidth and has upper and lower frequency limits that are static in time. For example, in an optical communications systems, the transmitter and receiver lasers typically exhibit a frequency difference due to dither, noise, and microphonic transients that is on the order of a few hundred megahertz. The combined effect of these frequency differences is that the AC-coupling notch 52 created by the AC-coupling capacitors 24 in the transmitter 2 will move within a bounded spectral region 54 (FIG. 2C) having a width equal to the sum of the maximum frequency errors of the two lasers. Since these maximum frequency errors are generally well characterised, the upper and lower frequency limits±$\Delta f$ of the spectral region 54 in which the notch 52 may be located can be well defined and are generally static in time. In the illustrated examples, the bounded region 54 is centered on 0 Hz, but this is not essential.

As is well known in the art, the bandwidth of a communication system normally exceeds the bandwidth of a data signal to be transported through the system. Typically, this excess bandwidth is used to enable transport of redundant information such as Forward Error Correction (FEC) parity information, to provide smooth pulse shaping filters such as raised-cosine pulses, to provide a degree of noise margin to improve the raw Bit Error Rate (BER) at the receiver. The present invention exploits this excess bandwidth to enable compensation of spectrally bounded impairments.

For the purpose of the present application, the term "adaptation function" shall be understood to refer to a nonlinear digital mathematical operation, or the analog equivalent, applied to a modulated data signal.

In general terms, the signal is digitally processed to apply a first adaptation function upstream of the analog channel, and a second adaptation function downstream of the analog channel. The first and second adaptation functions are selected to mitigate spectrally bounded impairments of the analog channel. In some embodiments, the first adaptation function operates to relocate vulnerable frequency components of the signal away from the bounded spectral region that is (or is predicted to be) affected by the spectrally bounded impairments of the analog channel, while the second adaptation function operates to return the relocated frequency components of the signal back to their original locations within the signal spectrum. In other embodiments, the first adaptation function includes copying the vulnerable frequency component of the signal. In some embodiments, the second adaptation function may include a combining operation. Representative embodiments of the present technique are described below with reference to FIGS. 3-10.

Figure 3A:
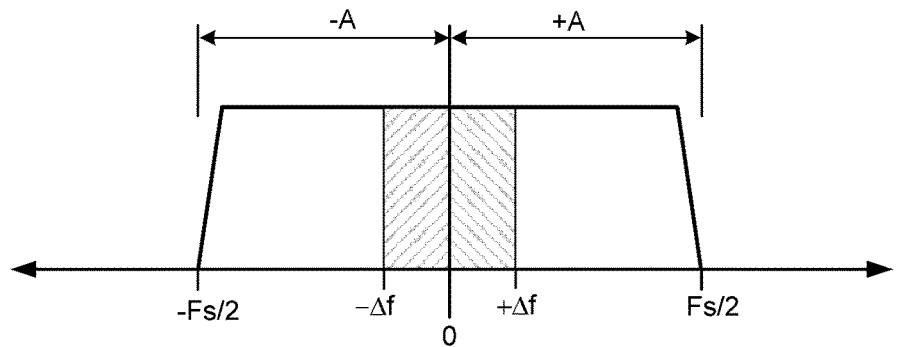
FIGS. 3A to 3C illustrate operation of a system in accordance with a first embodiment of the present technique.
Figure 3B:
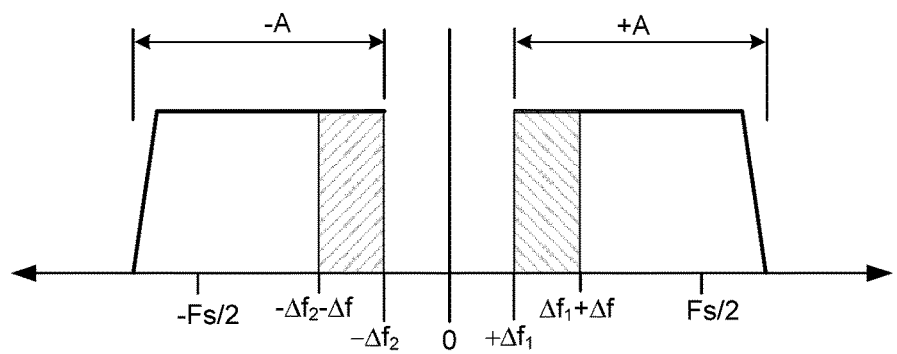
Figure 3C:
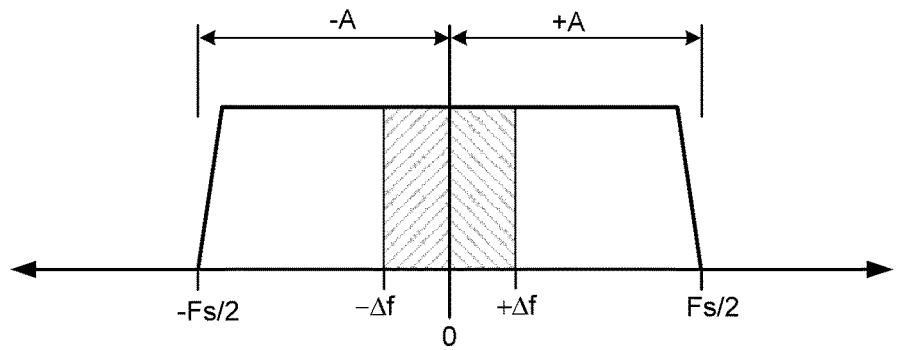

FIGS. 3A-3C illustrate operations of a first embodiment of the present technique. As may be seen in FIG. 3A, the signal spectrum nominally spans a frequency range of ±Fs/2, where Fs is the sample rate used by the DAC 6 (FIG. 1A). As in FIG. 2C, the bounded spectral region 54 that is affected (or is predicted to be affected) by AC-coupling capacitors 24 in the transmitter analog driver circuit 8 is shown as the shaded portion of the signal spectrum within a frequency range of ±$\Delta f$. As may be appreciated, valid low-frequency components of the signal are located within this bounded spectral region 54, and are vulnerable to distortion by the AC-coupling notch 52 caused by the high-pass characteristic of the AC-coupling capacitors 24. For convenience of description, the positive frequency components of the signal (lying between 0 and Fs/2) are collectively referenced as +A and the negative frequency components of the signal (lying between −Fs/2 and 0) are collectively referenced as −A.

In the embodiment of FIG. 3B, the impact of the AC-coupling notch 52 is avoided by processing the signal in the transmitter DSP 4 to apply an adaptation function in the form of frequency shifting the positive frequency components of the signal by $\Delta f_1$ and negative frequency components of the signal by −$\Delta f_2$ to open a dead-zone of the spectrum that corresponds with the bounded spectral region 54 that is (or is predicted to be) affected by the low frequency distortion introduced by the AC-coupling capacitors 24. In the embodiment of FIG. 3B, the frequency shift operation is symmetrical, so that $\Delta f_1 = \Delta f_2 = \Delta f$, but this symmetry is not essential. If desired, the dead-zone may be filled with "null fill" spectral components designed to provide a continuous spectral shape of the signal in the analog channel.

Referring now to FIG. 3C, in the receiver, the original signal spectrum can be recovered in the receiver DSP 48 by digitally processing the received signal spectrum to re-quency-shift the positive frequency components of the signal +A by $\Delta f_1$, and correspondingly frequency shifting the negative frequency components of the signal −A by +$\Delta f_2$. As may be seen in FIG. 3C, this has the effect of returning the spectral range of the signal to its original span between ±Fs/2, while simultaneously closing the dead-zone spanning ±$\Delta f$ of the received signal spectrum. If desired, any signal components (i.e. null fill) within the dead zone, which may or may not be corrupted by the AC-coupling notch 52, may be discarded during the frequency shifting operation of the receiver DSP 48.

Figure 4B:
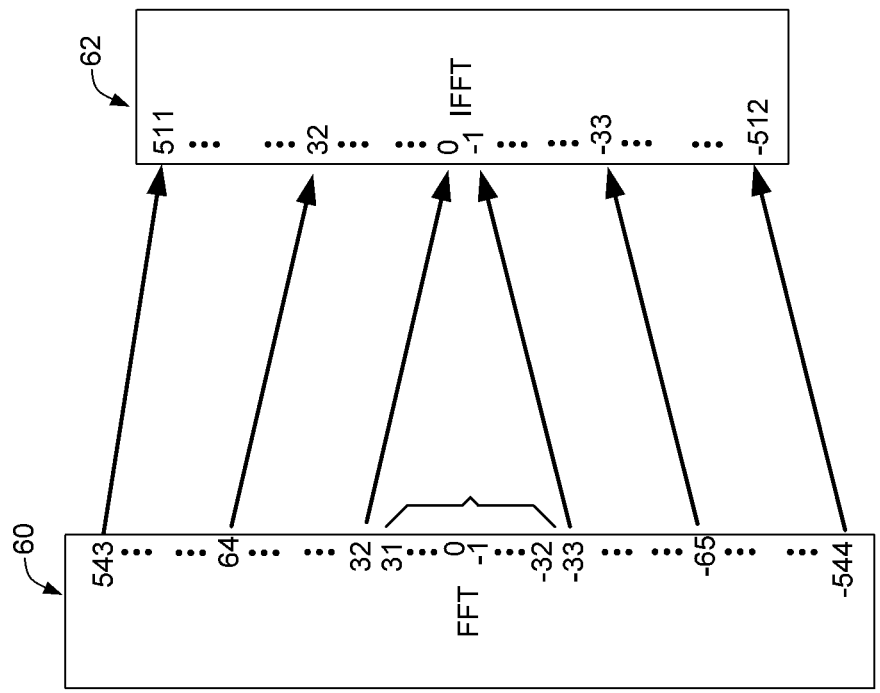
FIGS. 4A and 4B are block diagrams of a representative transmitter and receiver digital signal processors implementing the operation of FIGS. 3A-C.
Figure 4A:
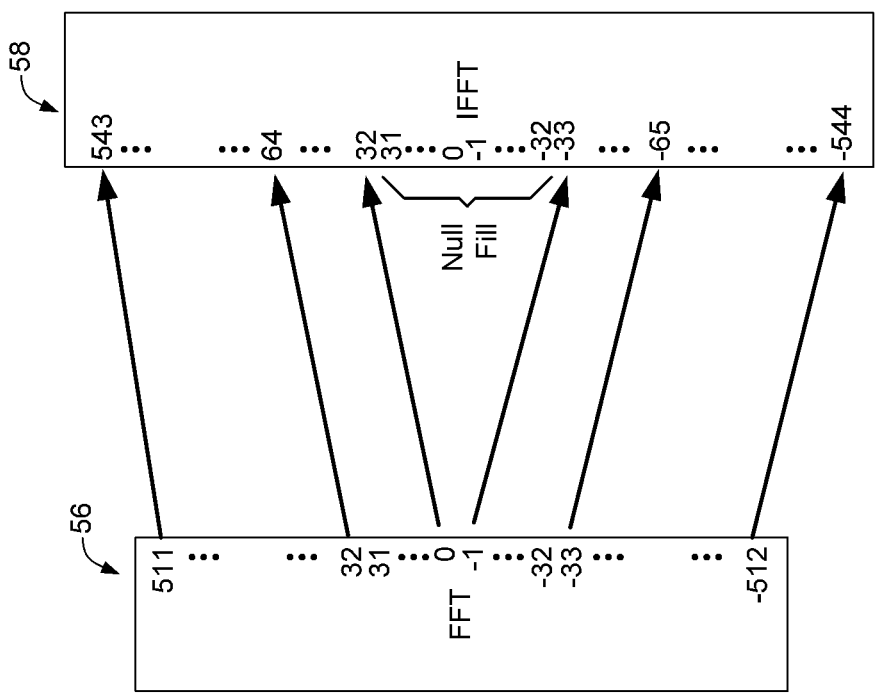

FIGS. 4A and 4B schematically illustrate elements of a transmitter DSP 4 and receiver DSP 48 capable of performing the frequency shifting operations described above with reference to FIGS. 3A-C.

In the embodiment of FIG. 4A, the transmitter DSP 4 includes a Fast Fourier Transform (FFT) block 56 configured to process the signal to compute a vector representing the spectrum of the signal, cascaded with an Inverse Fast Fourier Transform (IFFT) block 58 configured to process the vector to compute a time-domain output signal. The FFT and IFFT blocks 56, 58 may have any suitable width, and any suitable frequency domain processing blocks (not shown) may be provided between the FFT and the IFFT blocks, as desired. In the illustrated embodiment, the FFT block 56 has a width of 1024 taps denoted as taps −512 . . . 0 . . . 511. For the purposes of this example, the bounded spectral region spanning ±$\Delta f$ that is (or is predicted to be) affected by the AC-coupling notch 52 is taken as encompassing the center 64 taps of the FFT 56, denoted as taps −32 . . . 0 . . . 31. With this arrangement, frequency shifting the positive and negative frequency components of the signal +A and −A by ±$\Delta f$ (=$\Delta f_1 = \Delta f_2$) may be accomplished by mapping taps 0 . . . 511 of the FFT block 56 to input taps 32 . . . 543 of the IFFT block 58, and correspondingly mapping taps −1 . . . −512 of the FFT block 56 to input taps −33 . . . −544 of the IFFT block 58. If desired, a null fill may be supplied to the (otherwise un-used) center taps −32 . . . 0 . . . 31 of the IFFT block 58.

As may be seen in FIG. 4A, in order to accommodate this frequency shifting operation, the width of the IFFT block 58 must be greater than that of the FFT block 56. In many systems, this criterion is already satisfied as an oversampling is required in the FFT domain in order to accommodate smooth pulse-shape filtering methods such as Raised-Cosine shaping or return to zero or sample and hold shaping. Hence, the IFFT block 58 is typically much larger than FFT block 56 with enough room for high frequency content of both positive and negative frequency components of the signal +A and −A. This may increase the complexity of the transmitter, but the added cost associated with the increased IFFT width is very small in comparison to the packaging costs associated with large AC-coupling capacitors.

In the embodiment of FIG. 4B, the receiver DSP 48 includes a Fast Fourier Transform (FFT) block 60 configured to process the signal to compute a vector representing the spectrum of the signal, cascaded with an Inverse Fast Fourier Transform (IFFT) block 62 configured to process the vector to compute a time-domain output signal. The FFT and IFFT blocks 60, 62 may have any suitable width, although it is expected that the width of the FFT block 60 will correspond with the width of the transmitter IFFT block 58. Accordingly, in the illustrated embodiment the receiver FFT block 60 has a width of 1088 taps, while the IFFT block 62 has a width of 1024 taps. As in the transmitter DSP 4, any suitable frequency domain processing blocks (not shown) may be provided between the FFT and the IFFT blocks 60, 62 of the receiver DSP 48, as desired. In the illustrated embodiment, the IFFT block 62 has a width of 1024 taps denoted as taps −512 . . . 0 . . . 511. For the purposes of this example, the center 64 taps of the IFFT 62, denoted as taps −32 . . . 0 . . . 31 encompass the bounded spectral region spanning ±Δf that is (or is predicted to be) affected by the notch. With this arrangement, the original signal spectrum can be recovered by discarding the center 64 taps of the FFT 60, and then frequency shifting the positive and negative frequency components of the signal by mapping taps 32 . . . 543 of the FFT block 60 to input taps 0 . . . 511 of the IFFT block 62, and correspondingly mapping taps −33 . . . −544 of the FFT block 60 to input taps −1 . . . −512 of the IFFT block 62.

As may be appreciated, the embodiments of FIGS. 3 and 4 operate by digitally creating a dead-zone in the spectrum of the signal traversing the analog channel, and digitally removing the dead zone in the receiver. Consequently, any low frequency distortion due to an AC-coupling notch 52 within the dead zone is entirely eliminated, and so will not interfere with data detection and recovery in the receiver. In addition, the dead zone has a one side bandwidth of Δf. By setting this value to be equal to or greater than the sum of the maximum anticipated frequency offset δf between the transmitter and receiver lasers and the width of the AC-coupling notch 52 (i.e. $\Delta f \geq \delta f_{max} + w$) all anticipated interference from AC coupling capacitors in the analog channel can be eliminated, provided that the amount of laser frequency offset δf is either compensated upstream of the receiver DSP or else is known by the receiver DSP and compensated by implementing an asymmetric frequency shifting in the FFT domain. An advantage of this arrangement is that in many cases, the communications system has sufficient excess bandwidth that an AC-coupling notch 52 having a relatively large width, w, can be accommodated within a dead zone spanning a practical frequency range. This, in turn, allows significantly smaller AC coupling capacitors to be used in the analog channel than would be possible in the prior art without compromising the link performance.

FIGS. 5-8 schematically illustrate a communication system according to another embodiment of the present invention.

Figure 5A:
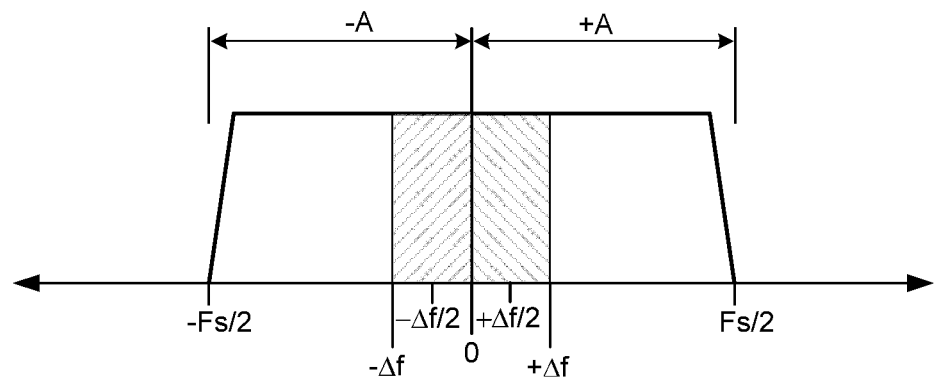
FIGS. 5A to 5C illustrate operation of a transmitter in a system in accordance with a second embodiment of the present technique.
Figure 5B:
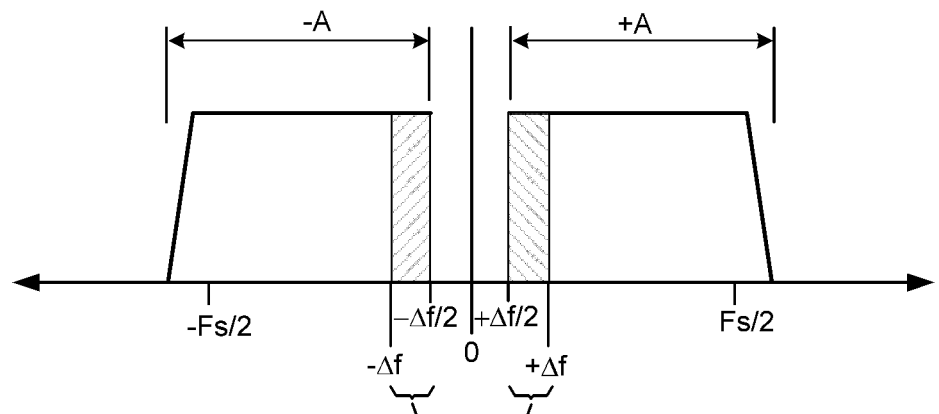
Figure 5C:
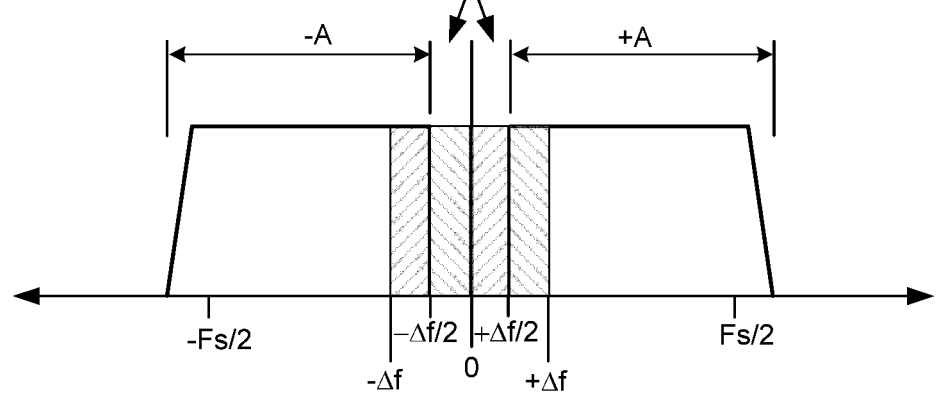

FIGS. 5A-5C illustrate operations implemented by the transmitter DSP 4. As may be seen in FIG. 5A, the signal spectrum nominally spans a frequency range of ±Fs/2, where Fs is the sample rate used by the DAC 6 (FIG. 1A). As in FIG. 2C, the bounded spectral region 54 that is affected (or is predicted to be affected) by AC-coupling capacitors 24 in the transmitter analog driver circuit 8 spans a frequency range of ±Δf.

Referring to FIGS. 5A and 5B, the impact of the AC-coupling notch 52 is avoided by processing the signal in the transmitter DSP 4 to frequency shift the positive and negative frequency components of the signal to open a dead-zone of the spectrum. This dead zone has a width nominally equal to half that of the bounded spectral region 54 that is (or is predicted to be) affected by the low frequency distortion introduced by the AC-coupling capacitors 24. Thus the positive frequency components are frequency shifted by $+\Delta f_1$ ($=\Delta f/2$) and negative frequency components are frequency shifted by $+\Delta f_2$ ($=\Delta f/2$). As may be seen in FIG. 5B, this means that valid frequency components of the signal will still lie within the bounded spectral region 54, at frequencies between −Δf and −Δf/2 and between Δf/2 and Δf. In order to avoid corruption of these frequency components, they are copied into the dead zone, as shown in FIG. 5C. Thus, frequency components lying in the range Δf/2 . . . Δf are duplicated and inserted into the dead zone at −Δf/2 . . . 0, while frequency components lying in the range −Δf . . . −Δf/2 are duplicated and inserted into the dead zone at 0 . . . Δf/2. The benefit of this duplication may be understood by considering that the width of the AC-Coupling notch 52 is normally less than Δf/2, even when small capacitors are used. In this case, the portion of the signal spectrum that is affected by the AC-Coupling notch 52 will be small enough that it will affect at most one of the two copies of the spectral components lying in the bounded spectral region 54. This means that there will always be sufficient data in the signal to enable reconstruction of the original spectrum in the receiver.

Figure 6:
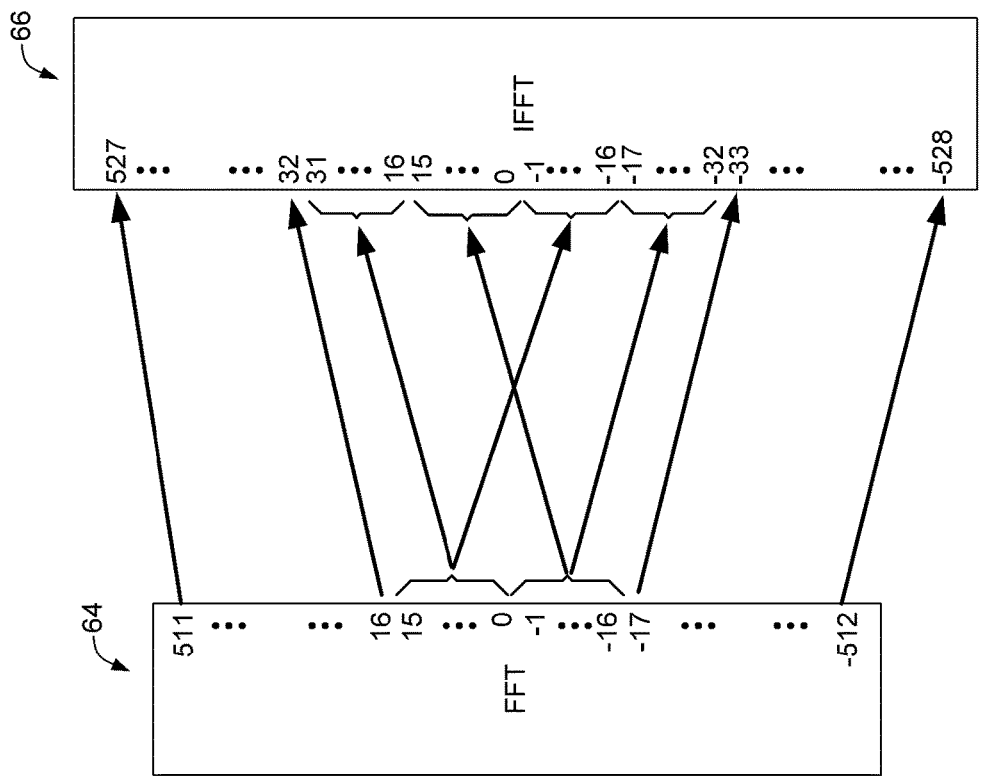
FIG. 6 is a block diagrams of a representative transmitter digital signal processor implementing the operation of FIGS. 5A-C.

FIG. 6 schematically illustrates elements of a transmitter DSP 4 capable of performing the frequency shifting operation described above with reference to FIGS. 5A-C.

In the embodiment of FIG. 6, the transmitter DSP 4 includes a Fast Fourier Transform (FFT) block 64 configured to process the signal to compute a vector representing the spectrum of the signal, cascaded with an Inverse Fast Fourier Transform (IFFT) block 66 configured to process the vector to compute a time-domain output signal. The FFT and IFFT blocks 64, 66 may have any suitable width, and any suitable frequency domain processing blocks (not shown) may be provided between the FFT and the IFFT blocks, as desired. In the illustrated embodiment, the FFT block 64 has a width of 1024 taps denoted as taps −512 . . . 0 . . . 511. For the purposes of this example, the bounded spectral region spanning ±Δf that is (or is predicted to be) affected by the AC-coupling notch 52 is taken as encompassing the center 64 taps of the FFT 64, denoted as taps −32 . . . 0 . . . 31. With this arrangement, frequency shifting the positive and negative frequency components of the signal +A and −A by $\pm\Delta f/2$ ($=\Delta f_1 = \Delta f_2$) may be accomplished by mapping taps 0 . . . 511 of the FFT block 64 to input taps 16 . . . 527 of the IFFT block 66, and correspondingly mapping taps −1 . . . −512 of the FFT block 64 to input taps −17 . . . −528 of the IFFT block 66. In addition, taps 0 . . . 15 of the FFT block 64 are duplicated and mapped to taps −16 . . . −1 of the IFFT block 66, while taps −16 . . . −1 of the FFT block 64 are duplicated and mapped to taps 0 . . . 15 of the IFFT block 66.

Figure 7A:
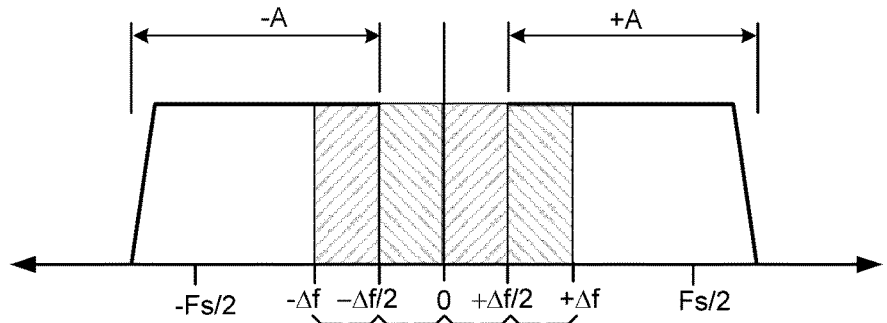
FIGS. 7A to 7C illustrate operation of a receiver in a system in accordance with the second embodiment of the present technique.
Figure 7B:
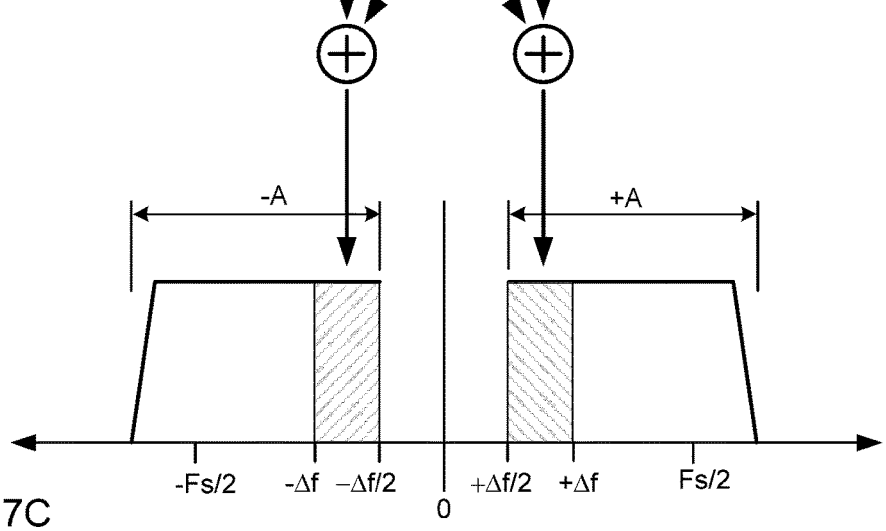
Figure 7C:
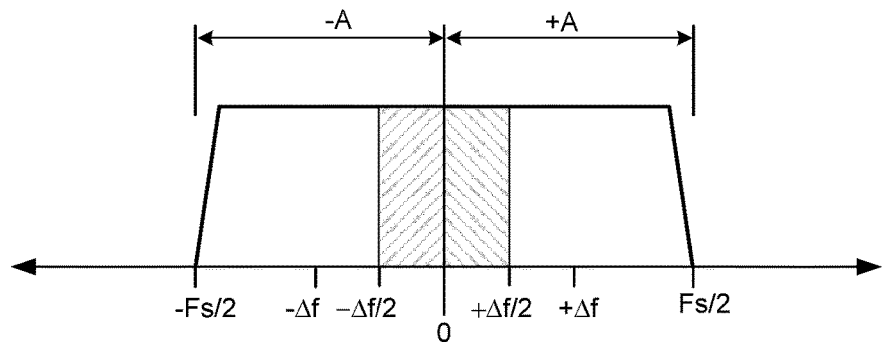

Referring now to FIGS. 7A-7C, in the receiver, the original signal spectrum can be recovered in the receiver DSP 48 by digitally processing the received signal spectrum to first reconstruct the low frequency components lying between $-\Delta f$ and $-\Delta f/2$ and between $\Delta f/2$ and $\Delta f$ of the spectrum, and then frequency-shifting the positive frequency components of the signal +A by $-\Delta f_1$ ($=\Delta f/2$), and correspondingly frequency shifting the negative frequency components of the signal $-A$ by $+\Delta f_2$ ($=\Delta f/2$).

As may be seen in FIGS. 7A and 7B, reconstruction of the low frequency components may be accomplished by combining each frequency component with its duplicate in the dead zone. Thus, the frequency components lying between $-\Delta f$ and $-\Delta f/2$ are combined with their respective duplicate frequency components lying between 0 and $\Delta f/2$, while the frequency components lying between $\Delta f/2$ and $\Delta f$ are combined with their respective duplicate frequency components lying between $-\Delta f/2$ and 0. For ease of illustration in FIGS. 7A and 7B, the combination operation is shown as a summation. In practice, such a summation would normally also include a scaling operation to ensure an appropriate magnitude of each combined frequency component such that the overall signal to noise ratio following combining is maximized. Alternatively, the summation may be replaced by a selection operation, in which a parameter (e.g. magnitude, signal to noise ratio etc.) of each frequency component is compared to its duplicate, and the best one of the two components is selected and inserted into the "combined" spectrum.

Referring now to FIGS. 7B and 7C, once the low frequency components of the spectrum have been reconstructed, the original signal spectrum can be recovered in the receiver DSP 48 by digitally processing the signal spectrum to frequency-shift the positive frequency components of the signal +A by $-\Delta f_1$ ($=\Delta f/2$), and correspondingly frequency shifting the negative frequency components of the signal $-A$ by $+-\Delta f_2$ ($=\Delta f/2$). This has the effect of returning the spectral range of the signal to its original span between $\pm Fs/2$, while simultaneously closing the dead-zone spanning $\pm\Delta f/2$ of the received signal spectrum.

Figure 8:
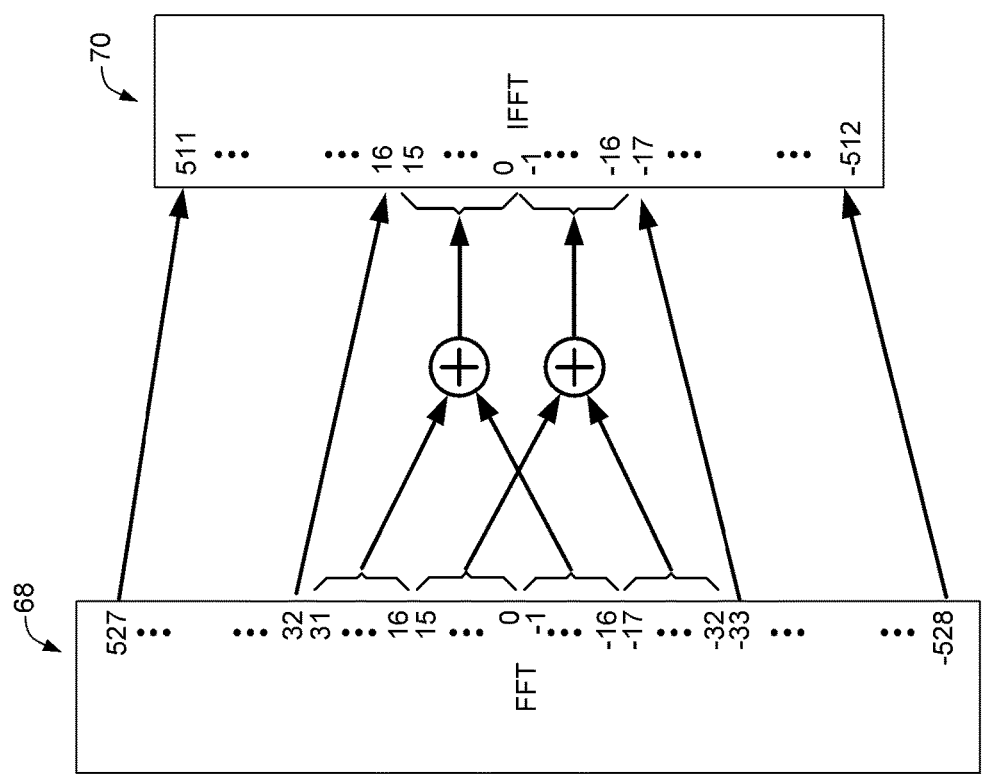
FIG. 8 is a block diagrams of a representative receiver digital signal processor implementing the operation of FIGS. 7A-C.

In the embodiment of FIG. 8, the receiver DSP 48 includes a Fast Fourier Transform (FFT) block 68 configured to process the signal to compute a vector representing the spectrum of the signal, cascaded with an Inverse Fast Fourier Transform (IFFT) block 70 configured to process the vector to compute a time-domain output signal. The FFT and IFFT blocks 68, 70 may have any suitable width, although it is expected that the width of the FFT block 68 will correspond with the width of the transmitter IFFT block 66. Accordingly, in the illustrated embodiment the receiver FFT block 68 has a width of 1056 taps, while the IFFT block 70 has a width of 1024 taps. As in the transmitter DSP 4, any suitable frequency domain processing blocks (not shown) may be provided between the FFT and the IFFT blocks of the receiver DSP 48, as desired. For the purposes of this example, the center 64 taps of the FFT 68, denoted as taps $-32 \ldots 0 \ldots 31$ encompass the bounded spectral region spanning $\pm\Delta f$ that is (or is predicted to be) affected by the notch, while the center 32 taps of the FFT 68, denoted as taps $-16 \ldots 0 \ldots 15$ encompass the dead zone spanning $\pm\Delta f/2$. With this arrangement, the original signal spectrum can be recovered by: combining FFT taps $-16 \ldots -1$ with FFT taps $16 \ldots 31$ and mapping the result to input taps $0 \ldots 15$ of the IFFT 70; combining FFT taps $0 \ldots 15$ with FFT taps $-32 \ldots -17$ and mapping the result to input taps $-16 \ldots -1$ of the IFFT 70; and then frequency shifting the remaining positive and negative frequency components of the signal by mapping taps $32 \ldots 527$ of the FFT block 68 to input taps $16 \ldots 511$ of the IFFT block 70, and correspondingly mapping taps $-33 \ldots -528$ of the FFT block 68 to input taps $-17 \ldots -512$ of the IFFT block 70.

As may be appreciated, the embodiment of FIGS. 5-8 operates by using the dead-zone to carry a duplicate of low-frequency components of the signal spectrum, so that these low frequency components can be properly reconstructed in the receiver DSP 48. Consequently, any low frequency distortion due to an AC-coupling notch 52 within the bounded spectral region of the signal can be compensated. In addition, the dead zone has a total width of $\Delta f$, which may be significantly less than the sum of the maximum anticipated frequency offset $\delta f$ between the transmitter and receiver lasers and the width of the notch (i.e. $\Delta f \leq \delta f_{max} + w$), as long as an appropriate combining of the relevant frequency taps is applied at the receiver DSP 48. An advantage of this arrangement is that significantly less excess bandwidth of the communications link is required (by a factor of 2 compared with the arrangement illustrated in FIGS. 3A-3C) in order to effectively compensate for the effects of the notch.

In the embodiments described above with reference to FIGS. 3-8, the receiver DSP 48 performs a symmetrical adaptation function to recover the original signal spectrum, by shifting the positive and negative frequency components symmetrically by $\Delta f_1 = \Delta f_2 = \pm\Delta f$ or $\pm\Delta f/2$. This symmetrical operation is accurate for cases in which the frequency offset $\delta f$ between the transmitter and receiver laser frequencies is close to zero (that is, less than the frequency difference between adjacent taps of the FFTs and IFFTs 56-70). In some embodiments, compensation for a non-zero frequency offset $\delta f$ may be implemented upstream of the receiver DSP 48 (for example via direct control of the transmitter and receiver laser frequencies, or by hetrodyning with an electrical mixing signal having an appropriate frequency in the analog signal path 40 up-stream of the ADC block 46) and in these cases, the techniques of FIGS. 3-8 may be successfully implemented.

Figure 9A:
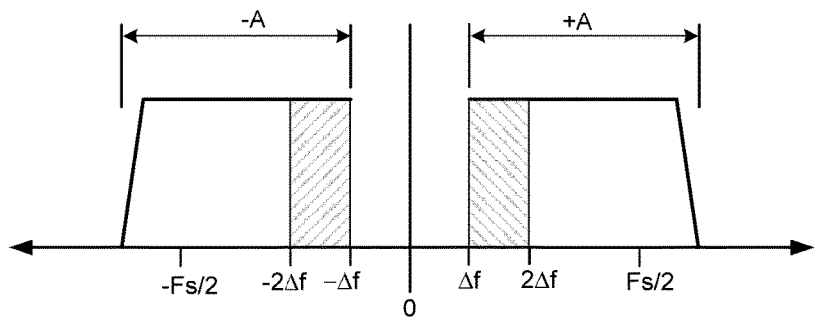
FIGS. 9A to 9D illustrate operation of the embodiment of FIGS. 3 and 4 in the presence of a non-zero frequency offset δf at the input of the receiver Digital Signal Processor (DSP)
Figure 9B:
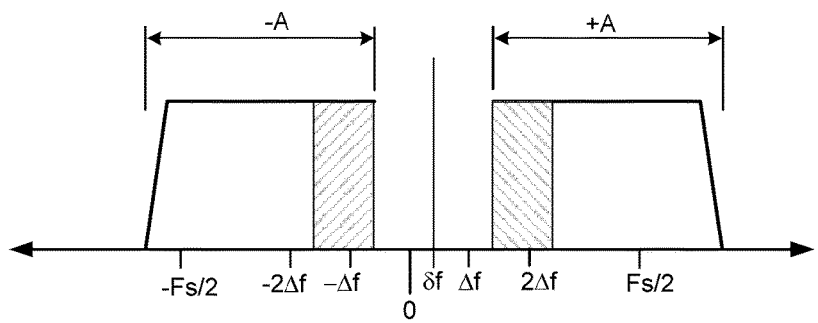
Figure 9C:
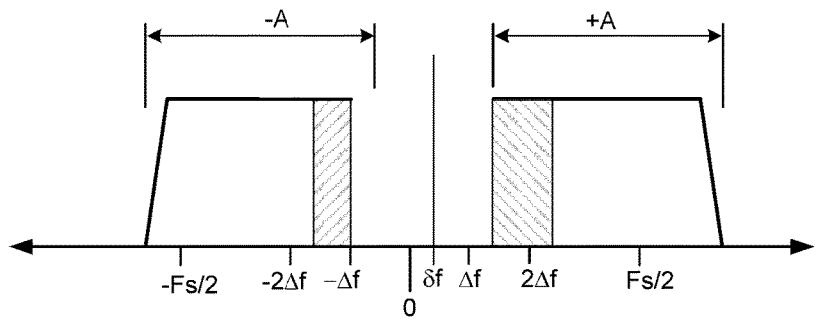
Figure 9D:
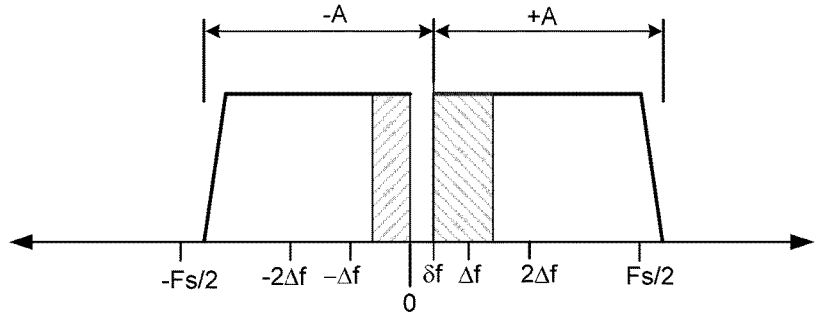

FIGS. 9A-9D illustrate a problem that can arise when the techniques of FIGS. 3-4 are implemented in the presence of non-zero frequency offset $\delta f$ at the input of the receiver DSP 48. FIG. 9A illustrates the signal spectrum at the output of the transmitter adaptation function (i.e. the output of the DSP 4 or DAC 6), and is described above with reference to FIG. 3B. FIG. 9B illustrates the corresponding signal spectrum at the receiver 26, with a positive frequency offset $\delta f$ between the transmitter and receiver laser frequencies. As may be seen in FIG. 9B, the signal spectrum is symmetrical about the frequency $\delta f$, and so is asymmetrical about 0 Hz. In this case, discarding the frequency components between $\pm\Delta f$, as described above with reference to FIGS. 3 and 4, will have the effect of unintentionally discarding low frequency components of the signal between $-\Delta f$ and $(-\Delta f + \delta f)$, as may be seen in FIG. 9C. Symmetrically shifting the (remaining) frequency components by $\pm\Delta f$ will have the effect of leaving the positive frequency components lying in the range $\delta f \ldots (\Delta f + \delta f)$, the negative frequency components lying in the range $(-Fs + \delta f) \ldots 0$ and a gap between 0 and $\delta f$, as may be seen in FIG. 9D.

As noted above, one solution to this problem is to compensate the frequency offset $\delta f$ upstream of the receiver DSP 48, so that the asymmetry of the signal spectrum at the input to the receiver DSP 48 is very close to zero.

An alternative approach is to implement a dynamic mapping between the receiver FFT 60, 68 and the receiver IFFT 62, 70, so that asymmetrical frequency shifting operations can be implemented in the DSP 48. For example, a parameter "C" may be defined as the number of FFT taps that corresponds with the actual frequency offset δf. Thus, $$C \sim \frac{\delta f}{a},$$

where "a" is the frequency difference between adjacent taps of the FFT. With this arrangement, the receiver DSP 48 of FIG. 4B can be modified such that the original signal spectrum is recovered by discarding taps (−32+C) . . . (31+C) of the FFT 60, and then frequency shifting the positive and negative frequency components of the signal by mapping taps (32+C) . . . (543+C) of the FFT block 60 to input taps 0 . . . 511 of the IFFT block 62, and correspondingly mapping taps (−33+C) . . . (−544+C) of the FFT block 60 to input taps −1 . . . −512 of the IFFT block 62. Similarly, the receiver DSP 48 of FIG. 8 can be modified such that the original signal spectrum is recovered by combining frequency taps (−16+C) . . . (−1+C) with taps (16+C) . . . (31+C) and mapping the result to input taps 0 . . . 15 of the IFFT 70; combining taps (C . . . 15+C) with taps (−32+C) . . . (−17+C) and mapping the result to input taps −16 . . . −1 of the IFFT 70; and then frequency shifting the positive and negative frequency components of the signal by mapping taps (32+C) . . . (527+C) of the FFT block 68 to input taps 16 . . . 511 of the IFFT block 70, and correspondingly mapping taps (−33+C) . . . (−528+C) of the FFT block 68 to input taps −17 . . . −512 of the IFFT block 70.

FIGS. 10A to 10E illustrate a further alternative, which allows recovery of the original signal spectrum in the presence of a non-zero frequency offset δf, but without requiring the receiver DSP 48 to implement a dynamic mapping operation. As may be seen in FIGS. 10A and 10B, the transmitter DSP 4 is configured to operate in a manner similar to that described above with reference to FIGS. 5 and 6, in that frequency components lying within the bounded region 54 that is (or is predicted to be) affected by the AC-coupling notch 52 are duplicated and inserted into the dead-zone created by frequency shifting positive and negative frequency portions of the spectrum. The primary difference is that, in the example of FIG. 10, the frequency shift and the widths of the duplicated bands are doubled to Δf, and so span the entire width of the bounded region 54. As may be seen in FIG. 10C, at the receiver 26, the signal spectrum is symmetrical about a frequency δf, which is offset from 0 Hz by the frequency difference between the transmitter and receiver lasers.

Figure 10A:
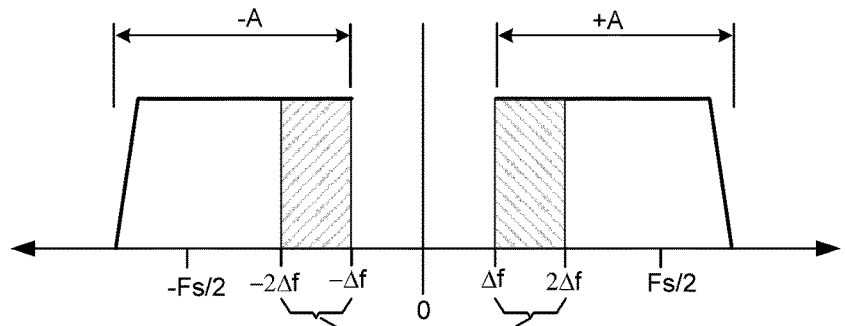
FIGS. 10A to 10E illustrate operation of a system in accordance with a third embodiment of the present technique.
Figure 10B:
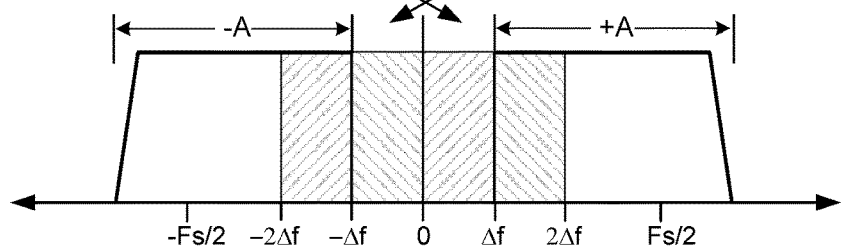
Figure 10C:
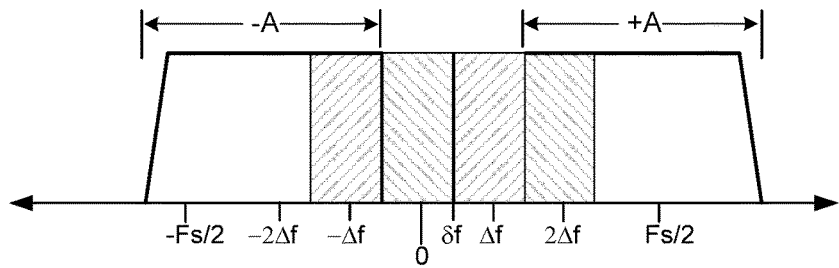
Figure 10D:
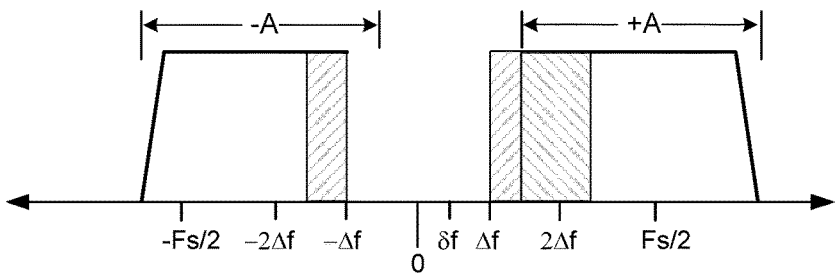
Figure 10E:
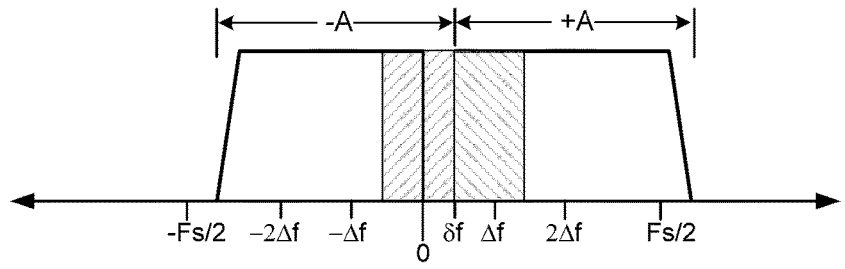

Referring to FIGS. 10D and 10E, the receiver DSP 48 is configured to operate in a manner identical to that described above with reference to FIGS. 3C and 4B, in that frequency components lying within the dead-zone (i.e. ±Δf, centered on 0 Hz) are discarded, and the remaining positive and negative frequency components are frequency shifted symmetrically (also about 0 Hz) by ±Δf. As may be seen in FIG. 10D, the discarding operation crops the low frequency components of the signal lying between −Δf and −Δf+δf, as described above, with reference to FIG. 9C. However, a duplicate copy of these low frequency components will remain between +Δf and +Δf+δf, as shown in FIG. 10D. Accordingly, symmetrically shifting the (remaining) frequency components by ±Δf will have the effect of leaving the positive frequency components lying in the range δf . . . Δf+δf, and the negative frequency components lying in the range −Fs+δf . . . +δf, so that the original spectrum is fully recovered—albeit with a frequency offset of δf from 0 Hz.

The embodiments of the invention described above are intended to be illustrative only. The scope of the invention is therefore intended to be limited solely by the scope of the appended claims.

We claim:

1. In a communication system having an analog channel configured to convey a data signal from a transmitter to a receiver, a method of mitigating narrow-band impairment imposed by the analog channel on the data signal within a bounded spectral region of a spectrum of the data signal, the method comprising:

applying, by a transmitter digital signal processor (Tx DSP) comprised in the transmitter, a first adaptation function to the data signal prior to transmitting the data signal through the analog channel, wherein applying the first adaptation function comprises relocating frequency components of the data signal to a portion of a spectral band of the analog channel that is not affected by the narrow-band impairment; and applying, by a receiver digital signal processor (Rx DSP) comprised in the receiver, a second adaptation function to the data signal received through the analog channel, wherein applying the second adaptation function comprises returning the relocated frequency components of the data signal to their original position within the spectrum of the data signal, wherein the first and second adaptation functions are selected to cooperatively mitigate effects of the narrow-band impairment imposed by the analog channel.

2. The method as claimed in claim 1, wherein the bounded spectral region of the data signal has a width denoted 2Δf, and the first adaptation function relocates the frequency components of the data signal by frequency shifting positive frequency components of the data signal by a first frequency shift denoted +Δf$_1$ and frequency shifting negative frequency components of the data signal by a second frequency shift denoted −Δf$_2$, where the first frequency shift Δf$_1$ and a magnitude of the second frequency shift Δf$_2$ are greater than 0.

3. The method as claimed in claim 2, wherein either the sum of the first frequency shift and the magnitude of the second frequency shift is equal to the width of the bounded spectral region, expressed as Δf$_1$+Δf$_2$=2Δf, or the sum is equal to one half of the width of the bounded spectral region, expressed as Δf$_1$+Δf$_2$=Δf.

4. The method as claimed in claim 2, wherein applying the first adaptation function further comprises, after frequency shifting the positive and negative frequency components, inserting null fill spectral components into the spectrum of the data signal between the second frequency shift −Δf$_2$ and the first frequency shift +Δf$_1$.

5. The method as claimed in claim 2, wherein applying the first adaptation function further comprises, after frequency shifting the positive and negative frequency components, inserting a copy of frequency components of the data signal lying between the first frequency shift Δf$_1$ and one half of the width of the bounded spectral region +Δf into a dead zone portion between the second frequency shift −Δf$_2$ and 0, and inserting a copy of frequency components of the data signal lying between negative one half of the width of the bounded spectral region −Δf and the second frequency shift −Δf$_2$ into a dead zone portion between 0 and the first frequency shift Δf$_1$.

6. The method as claimed in claim 2, wherein applying the second adaptation function returns the relocated frequency components to their original position within the spectrum of the data signal by frequency shifting positive frequency components of the data signal by a negative of the first frequency shift $-\Delta f_1$, and frequency shifting negative frequency components of the data signal by the magnitude of the second frequency shift $+\Delta f_2$.

7. The method as claimed in claim 6, wherein applying the second adaptation function further comprises discarding spectral components between the second frequency shift $-\Delta f_2$ and the first frequency shift $+\Delta f_1$.

8. The method as claimed in claim 6, wherein applying the second adaptation function further comprises combining frequency components of the data signal lying between the first frequency shift $\Delta f_1$ and one half of the width of the bounded spectral region $+\Delta f$ with frequency components of the data signal lying between the second frequency shift $-\Delta f_2$ and 0, and combining frequency components of the data signal lying between negative one half of the width of the bounded spectral region $-\Delta f$ and the second frequency shift $-\Delta f_2$ with frequency components of the data signal lying between 0 and the first frequency shift $\Delta f_1$.

9. The method as claimed in claim 8, wherein combining the frequency components of the data signal comprises either one of:
adding each frequency component of the data signal with its respective duplicate; and
comparing each frequency component of the data signal with its respective duplicate and selecting a best one of two frequency components.

10. A communications system configured to convey a data signal from a transmitter to a receiver via an analog channel, the analog channel imposing a narrow-band impairment on the data signal within a bounded spectral region of a spectrum of the data signal, the communications system comprising:
the transmitter including a transmitter digital signal processor (Tx DSP) configured to apply a first adaptation function to the data signal prior to transmitting the data signal through the analog channel; and
the receiver including a receiver digital signal processor (Rx DSP) configured to apply a second adaptation function to the data signal received through the analog channel,
wherein the first and second adaptation functions are selected to cooperatively mitigate effects of the narrow-band impairment imposed by the analog channel.

11. The system as claimed in claim 10, wherein:
the Tx DSP is configured:
to perform a Fast Fourier Transform (FFT) on the data signal to compute a Tx FFT output array of frequency components of the spectrum of the data signal;
to perform an Inverse Fast Fourier Transform (IFFT) on a Tx IFFT input array indicative of a spectrum of the analog channel to generate a digital drive signal for driving a modulator of the transmitter; and
to apply the first adaptation function by mapping between the Tx FFT output array and the Tx IFFT input array such that frequency components of the data signal are relocated to a portion of a spectral band of the analog channel that is not affected by the narrow-band impairment; and
the Rx DSP is configured:
to perform a Fast Fourier Transform (FFT) to compute a Rx FFT output array of frequency components indicative of the spectrum of the analog channel;
to perform an Inverse Fast Fourier Transform (IFFT) on a Rx IFFT input array indicative of a modified spectrum of the analog channel to generate an output signal representative of the digital drive signal; and
to apply the second adaptation function by mapping between the Rx FFT output array and the Rx IFFT input array such that the relocated frequency components are returned to their original position within the spectrum of the data signal.

12. The system as claimed in claim 11, wherein the bounded spectral region of the data signal has a width denoted $2\Delta f$, and the frequency components of the data signal are relocated by frequency shifting positive frequency components of the data signal by a first frequency shift denoted $+\Delta f_1$ and frequency shifting negative frequency components of the data signal by a second frequency shift denoted $-\Delta f_2$, where the first frequency shift $\Delta f_1$ and a magnitude of the second frequency shift $\Delta f_2$ are greater than 0.

13. The system as claimed in claim 12, wherein the Tx DSP is further configured to apply the first adaptation function by inserting null fill spectral components into the spectrum of the data signal between the second frequency shift $-\Delta f_2$ and the first frequency shift $+\Delta f_1$ after frequency shifting the positive and negative frequency components.

14. The system as claimed in claim 12, wherein the Tx DSP is further configured to apply the first adaptation function by inserting a copy of frequency components of the data signal lying between the first frequency shift $\Delta f_1$ and one half of the width of the bounded spectral region $+\Delta f$ into a dead zone portion between the second frequency shift $-\Delta f_2$ and 0, and inserting a copy of frequency components of the data signal lying between negative one half of the width of the bounded spectral region $-\Delta f$ and the second frequency shift $-\Delta f_2$ into a dead zone portion between 0 and the first frequency shift $\Delta f_1$ after frequency shifting the positive and negative frequency components.

15. The system as claimed in claim 12, wherein the relocated frequency components are returned to their original position within the spectrum of the data signal by frequency shifting positive frequency components of the data signal by a negative of the first frequency shift $-\Delta f_1$, and frequency shifting negative frequency components of the data signal by the magnitude of the second frequency shift $+\Delta f_2$.

16. The system as claimed in claim 15, wherein the Rx DSP is further configured to apply the second adaptation function by combining frequency components of the data signal lying between the first frequency shift $\Delta f_1$ and one half of the width of the bounded spectral region $+\Delta f$ with frequency components of the data signal lying between the second frequency shift $-\Delta f_2$ and 0, and combining frequency components of the data signal lying between negative one half of the width of the bounded spectral region $-\Delta f$ and the second frequency shift $-\Delta f_2$ with frequency components of the data signal lying between 0 and the first frequency shift $\Delta f_1$.

17. The system as claimed in claim 16, wherein combining the frequency components of the data signal comprises either one of:
adding each frequency component of the data signal with its respective duplicate; and
comparing each frequency component of the data signal with its respective duplicate and selecting a best one of two frequency components.

18. A receiver of a communications system configured to convey an original data signal from a transmitter to the receiver via an analog channel, the analog channel imposing a narrow-band impairment on the original data signal within a bounded spectral region of a spectrum of the original data signal, the receiver comprising:
- a receiver digital signal processor (Rx DSP) configured to apply a second adaptation function to a received data signal received through the analog channel from a transmitter digital signal processor (Tx DSP) comprised in the transmitter, the Tx DSP being configured to apply a first adaptation function to the original data signal prior to transmitting the original data signal through the analog channel,
- wherein the first and second adaptation functions are selected to cooperatively mitigate effects of the narrow-band impairment imposed by the analog channel.

19. The receiver as claimed in claim 18, wherein the Tx DSP implements the first adaptation function by relocating frequency components of the original data signal to a portion of a spectral band of the analog channel that is not affected by the narrow-band impairment, and wherein the Rx DSP is configured:
- to perform a Fast Fourier Transform to compute an output array of frequency components indicative of a spectrum of the analog channel;
- to perform an Inverse Fast Fourier Transform on an input array indicative of a modified spectrum of the analog channel to generate an output signal representative of a digital drive signal that was used for driving a modulator of the transmitter; and
- to apply the second adaptation function by mapping between the output array and the input array such that the relocated frequency components are returned to their original position within the spectrum of the original data signal.

* * * * *